United States Patent [19]

Inaba et al.

[11] Patent Number: 4,540,212
[45] Date of Patent: Sep. 10, 1985

[54] INDUSTRIAL ROBOT HAND

[75] Inventors: Hajimu Inaba, Hino; Ryo Nihei, Musashino, both of Japan

[73] Assignee: Fanuc Limited, Hino, Japan

[21] Appl. No.: 491,198

[22] PCT Filed: Aug. 25, 1982

[86] PCT No.: PCT/JP82/00336
§ 371 Date: Apr. 25, 1983
§ 102(e) Date: Apr. 25, 1983

[87] PCT Pub. No.: WO83/00652
PCT Pub. Date: Mar. 3, 1983

[30] Foreign Application Priority Data

Aug. 25, 1981 [JP] Japan .................. 56-132073

[51] Int. Cl.³ .............................. B66C 3/16
[52] U.S. Cl. .................... 294/88; 294/106; 294/115
[58] Field of Search ............ 294/88, 116, 87.24, 294/104, 106, 115, 100, 118, 87 R; 269/32, 34, 257, 264; 414/739, 751, 753

[56] References Cited

U.S. PATENT DOCUMENTS

| 3,759,563 | 9/1973 | Kitamura | 294/88 |
| 3,945,676 | 3/1976 | Asamoto | 294/88 |
| 4,185,866 | 1/1980 | Wittwer | 294/88 |

FOREIGN PATENT DOCUMENTS

| 48-51460 | 7/1973 | Japan | 294/88 |
| 51-17658 | 5/1976 | Japan | 294/88 |

Primary Examiner—James B. Marbert
Attorney, Agent, or Firm—Armstrong, Nikaido, Marmelstein & Kubovcik

[57] ABSTRACT

An industrial robot hand having swing fingers (18a and 18b) for gripping a work pivotally mounted on a hand base member (10) which is attached to the free end of a wrist unit, said swing fingers being members formed of a sheet metal through a pressing process in a U-shaped cross-section, and said swing fingers having a U-shaped cross-section and a hydraulic actuator (24) linked together with chain pin links (32a and 32b).

2 Claims, 3 Drawing Figures

INDUSTRIAL ROBOT HAND

FIELD OF THE INVENTION

The present invention relates to an industrial robot and, more particularly, to a novel construction of an industrial robot hand.

BACKGROUND ART

Industrial robots, which are capable of gripping an object with a robot hand and carrying the object from one position to another position or exchanging works by mounting a work on and removing the same from the chuck of a machine tool, have come into use. The general construction of such an industrial robot includes a robot body capable of turning and moving vertically with respect to the stationary base of the industrial robot, a robot arm laterally extendable with respect to the robot body, and a wrist unit joined to the free end of the robot arm for turning and swinging motion. A robot hand is joined to the wrist unit. Since an industrial robot consists of such operating components, facilitating the manufacturing processes for each operating component through simplifying the construction results in a reduction of the total cost of the industrial robot. Accordingly, efforts are being made to develop improvements for simplifying the construction as well as for improving the performance of those operating components along with the increasingly widespread use of industrial robots.

DISCLOSURE OF THE INVENTION

Accordingly, it is an object of the present invention to provide, as one of the improvements, an industrial robot hand capable of being formed by utilizing existing mechanical parts and elements and through low-cost processes at a reduced cost, hence to provide an industrial robot of a reduced cost.

An industrial robot hand formed in accordance with the present invention has work gripping swing fingers and is adapted to be joined to the free end of a wrist unit, wherein each of the swing fingers is formed in a U-shaped cross-section by pressing a sheet material and is pivotally mounted on a hand base member having an attaching part for joining the robot hand to the wrist unit and wherein the swing finger of the U-shaped cross-section and a finger actuator are linked with a pin link of a chain.

BEST MODE OF CARRYING OUT THE INVENTION

Figure 1:
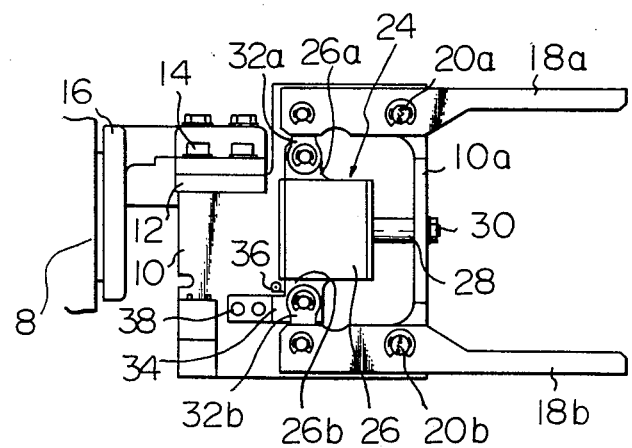
FIG. 1 is an elevation of an industrial robot hand embodying the present invention.
Figures 2, 3:
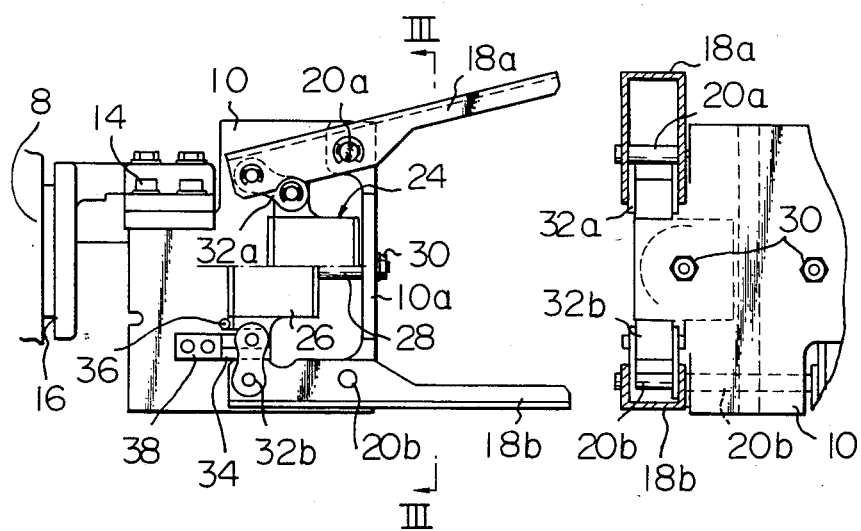
FIG. 2 is an elevation of the same industrial robot hand for facilitating the explanation of the gripping motion of the robot hand.
FIG. 3 is a sectional view taken along line III—III of FIG. 2.

Referring to FIG. 1, an industrial robot hand in accordance with the present invention has a flange 12 provided in a hand base 10 and is joined to an industrial robot wrist unit 8 through jointing means such as a safety joint 16 which is fastened to the flange 12 with screws and pins 14. A pair of finger members 18a and 18b are pivotally mounted on the front part of the hand base 10 by means of pivotal pins 20a and 20b, respectively. The finger members 18a and 18b can swing between a closed state, as shown in FIG. 1, and an open state, in which the finger members 18a and 18b are moved away from each other. The free end of the actuating rod 28 of an oil-hydraulic or pneumatic hydraulic cylinder 24 is fastened to the front wall 10a of the hand base 10 by means of a nut 30. When pressurized fluid is supplied selectively to the hydraulic cylinder 24, the cylinder tube 26 of the hydraulic cylinder 24 is caused to perform sliding motion relative to the actuating rod 28 between a position adjacent to the front wall and a position apart from the front wall 10a. The cylinder tube 26 is provided with two lugs 26a and 26b. The lugs 26a and 26b and the respective rear ends of the finger members 18a and 18b are linked together with pin links 32a and 32b, respectively. As shown in FIG. 3, each of the finger members 18a and 18b has a U-shaped cross-section. It is one of the features of the present invention that the finger members 18a and 18b are sheet metal members of the same shape and the same size formed by pressing a sheet metal having an appropriate strength and that the U-shaped cross-section provides an appropriate mechanical rigidity. The width of the U-shaped cross-section is designed to receive the pin links 32a and 32b of a chain therein. Thus, forming the finger members 18a and 18b in sheet metal members as described hereinbefore reduces the manufacturing cost and the material cost remarkably as compared with forming the finger members through mechanical processes such as machining or casting processes employing a mold. Accordingly, forming the finger members with a sheet metal contributes greatly, together with the employment of the pin links 32a and 32b of a chain and the hydraulic cylinder 24, available on the market as commercial parts, to reducing the cost of the robot hand. Referring now to FIG. 2, when the cylinder tube 26 of the hydraulic cylinder 24 slides toward the front wall 10a of the hand base 10, the finger members 18a and 18b are caused to swing on the respective pivotal pins 20a and 20b in a manner that the respective free ends of the finger members 18a and 18b move away from each other. The upper half of FIG. 2 shows a typical state in which the finger member has been opened, while the lower half shows the finger member is the closed state. Accordingly, one and the same cylinder tube 26 of the hydraulic cylinder 24 is shown as positioned at two positions, namely, at a position adjacent to the front wall 10a and a position away from the front wall 10a, in the upper and lower halves of FIG. 2, respectively. Reference numeral 34 designates a position detecting means such as a limit switch attached to the hand base 10 by means of an attaching member 38. The switch actuator 36 of the position detecting means 34 is disposed so as to be able to detect a position of the cylinder tube 26 of the hydraulic cylinder 24 remote from the front wall 10a of the hand base 10, wherein the finger members 18a and 18b are in the closed state. The output signal of the position detecting means 34 is sent to the robot control system of the industrial robot to inform the closed state of the finger members 18a and 18b. Although FIGS. 1 and 2 show the constitution of a robot hand having a single pair of upper finger member 18a and a lower finger member 18b, it is obvious from FIG. 2 that a so-called double-hand type robot hand can be constituted by providing a pair of finger members 18a and 18b on one side of the hand base 10 and another pair of finger members, not shown, on the other side of the hand base 10 so as to be able to swing. Furthermore, in the embodiment of the present invention as shown in FIGS. 1 to 3, the constitution of the robot hand allows the finger members 18a and 18b to swing within a vertical plane. Naturally, however, the present invention can be embodied in another constitution in which the finger members swing in a horizontal plane. Still further, forming the free end of each of the finger members 18a and 18b beforehand in a shape complementary with respect to the external shape of an object to be gripped with the finger members during the sheet metal forming process will naturally enable the robot hand to grip the object more firmly. Still further, the pivotal pins 20a and 20b and the finger members 18a and 18b, the chain pin links 32a and 32b and the finger members 18a and 18b and the chain pin links 32a and 32b and the lugs 26a and 26b of the hydraulic cylinder 24 can easily be joined together by means of commercially available C-type or E-type snap rings. The robot hand illustrated in FIGS. 1 to 3 assumes a construction employing such snap rings for such purposes.

We claim:

1. An industrial robot hand having swing fingers for gripping a work and adapted to be joined to the free end of a wrist unit comprising:
    a pair of opposed rigid unitary swing fingers pivotally mounted to a swing finger actuator mounted on a hand base member attached to said wrist unit,
    the swing finger actuator including a hydraulic cylinder having a piston rod fastened to said hand base member and adapted to cause swing fingers to operate by the sliding movement of the cylinder tube,
    said swing fingers having a U-shaped cross section and being formed from sheet metal by a pressing process,
    a position detecting means for detecting a terminal position of the sliding movement of said actuator cylinder tube including a signal whereby the fully closed position of said swing fingers is indicated by a signal; and
    the pivotal connections of said swing fingers being made by chain pin links.

2. An industrial robot hand according to claim 1, wherein a pair of said swing fingers are pivotally mounted on each side of said hand base member so that a double-hand system is formed.

* * * * *